United States Patent [19]
Sun et al.

[11] Patent Number: 5,939,825
[45] Date of Patent: Aug. 17, 1999

[54] ALTERNATING CURRENT THIN FILM ELECTROLUMINESCENT DEVICE HAVING BLUE LIGHT EMITTING ALKALINE EARTH PHOSPHOR

[75] Inventors: Sey-Shing Sun, Beaverton, Oreg.; Jim Kane, Lawrenceville; P. Niel Yocom, Princeton, both of N.J.

[73] Assignee: Planar Systems, Inc., Beaverton, Oreg.

[21] Appl. No.: 08/759,293

[22] Filed: Dec. 2, 1996

[51] Int. Cl.[6] .................................................. H05B 33/10
[52] U.S. Cl. ........................... 313/503; 313/498; 313/483
[58] Field of Search .................................. 313/503, 502, 313/504, 505, 512, 467, 468, 498, 483

[56] References Cited

U.S. PATENT DOCUMENTS

| | | | |
|---|---|---|---|
| 4,365,184 | 12/1982 | Higton et al. | 313/503 |
| 4,442,377 | 4/1984 | Higton et al. | 313/503 |
| 4,725,344 | 2/1988 | Yocom et al. | 204/192.15 |
| 4,751,427 | 6/1988 | Barrow et al. | 313/503 |
| 5,677,594 | 10/1997 | Sun et al. | 313/503 |

OTHER PUBLICATIONS

James Kane, et al., "New Electroluminescent Phosphors Based On Strontium Sulfide" 1985 International Display Research Conference, 1985, pp. 163–166.

Takashi Nire, et al., "A Double–Hetero–Interface Structured Active Layer" Research Division, Komatsu Ltd., Kanagawa, Japan, 1992.

A.K. Uppal, et al., Temperature–dependent Photoluminescence & Phosphorescence Decay in CaS:Cu & CaS:Ce Phosphors Using $N_2$–Pulsed Laser Indian Journal of Pure & Applied Physics, vol. 25, Feb. 1987, pp. 72–76.

W. Lehmann, et al., "Fast Cathodoluminescence Calcium Sulfide Phosphors" J. Electrochem. Soc.: Solid–State Science and Technology, vol. 119, No. 2, Feb. 1972, pp. 275–277.

Hideomi Onishi, et al., "Blue–Green Color TFEL Device With Sputtered Srs:Ce Thin Films" Proceedings of the SID, vol. 31/1, 1990, pp. 31–36.

Temperature–Dependent Photoluminescence & Phosphorescence Decay In CaS:Cu & CaS:Ce Phosphors Using $N_2$–Pulsed Laser, AK Uppal, S.N. Chaturvedi & N. Nath Department of Physics, Kurukshetra University, Kurukshetra, received Nov. 24, 1986.

A Double–Hetero–Interface Structured Active Layer, Takashi Nire, et al., Research Division, Komatsu Ltd., Kanagawa, Japan, Proceedings of SID, vol. 31/1, 1990.

New Electroluminescent Phosphors Based on Strontium Sulfide, 1985 International Display Research Conference, James Kane, et al., RCA Laboratories, Princeton, New Jersey, 1985.

Blue–Green Color TFEL Device with Sputtered SrS:Ce Thin Films Hideomi Ohnishi and Tatsuhiko Okuda, Proceedings of the SID, vol. 31/1, 1990.

(List continued on next page.)

*Primary Examiner*—Vip Patel
*Assistant Examiner*—Matthew J. Gerike
*Attorney, Agent, or Firm*—Chernoff, Vilhauer, McClung & Stenzel, LLP

[57] ABSTRACT

A light emitting phosphor having improved luminance is incorporated into an ACTFEL device having front and rear electrode sets, a pair of insulators sandwiched between the front and rear electrode sets, and a thin film electroluminescent laminar stack which includes a phosphor layer having the formula $M^{II}S:D,H,F$ where $M^{II}$ is taken from the group calcium, strontium, barium, and magnesium, S=sulfur, D is taken from the group copper, lead, gold, silver, magnesium, antimony, bismuth and arsenic, H is taken from the group fluorine, chlorine, bromine, and iodine, and F is taken from the group gallium, indium, aluminum, germanium, silicon, lanthanum, scandium, and yttrium. Deep blue and green chromaticity phosphors may be obtained through selection of multiple co-dopants and adjusting their relative concentrations.

12 Claims, 3 Drawing Sheets

U.S. PATENT DOCUMENTS

Alkaline Earth Sulfide Phosphors Activated by Cooper, Silver and Gold Willi Lehmann, Westinghouse Research Laboratories, Pittsburgh, Pa., SSI, Nov. 1970.

Fast Cathodoluminescent Calcium Sulfide Phosphors, W. Lehmann and F.M. Ryan Westinghouse Research Laboratories, Pittsburgh, Pa., Technical Notes J. Electrochem Soc., Feb. 1972.

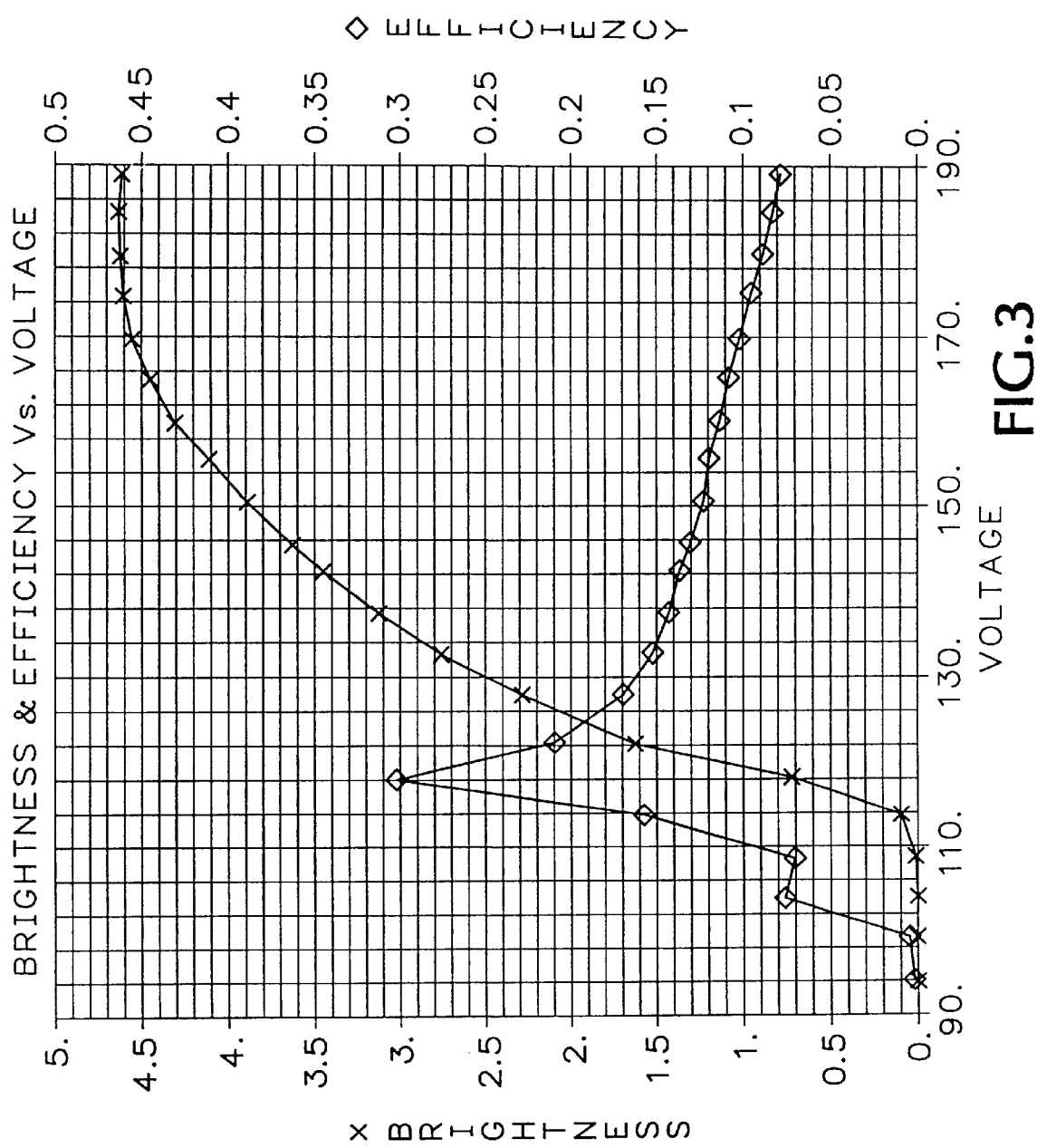

ALTERNATING CURRENT THIN FILM ELECTROLUMINESCENT DEVICE HAVING BLUE LIGHT EMITTING ALKALINE EARTH PHOSPHOR

The following application relates to thin film electroluminescent phosphor material and in particular to alkaline earth sulfide thin films with multiple coactivator dopants.

BACKGROUND OF THE INVENTION

Thin films of rare earth doped alkaline earth sulfides such as cerium doped strontium sulfide have been extensively investigated for applications in full color AC thin film electroluminescent (ACTFEL) display devices. Such a device is shown in Barrow et al., U.S. Pat. No. 4,751,427. The emission spectrum of SrS:Ce is very broad covering both blue and green portions of the visible spectrum, i.e., 440 to 660 nm with a peak at around 500 nm. A full color ACTFEL display device can be obtained by adding a red emitting phosphor, for example CaS:Eu or one that has a red component in its emission spectrum. With such a combination of films, one can build a white light emitting phosphor stack. White phosphor structures can then be laminated with primary color filters to build a color display which is very cost effective in terms of production.

With white light emitting phosphor stacks, however, the blue portion of the emission spectrum can be rather weak, particularly strontium sulfide phosphor doped with cerium which in the past has been the most promising of the blue emitting phosphors. Only about 10% of the original luminance can be obtained after filtering if a nearly blue color is to be achieved. For blue coloration in the CIE range of x=0.10, y=0.13 the transmission ratio is further reduced to only about 4%. Therefore, to produce a color display with acceptable luminance, it is necessary to use a lighter blue color filter but this in turn leads to a compromised blue chromaticity. Any display fabricated with such a poor blue chromaticity has a limited color gamut and is unable to produce the range of colors available with CRT or LCD technology.

Therefore, in order to achieve a high performance color ACTFEL display, the blue emission efficiency of the EL phosphor thin film must be greatly improved. In U.S. Pat. No. 4,725,344, Yocom, et al., a method is disclosed for forming alkaline earth sulfide luminescent films by chemical reaction between alkaline earth metal halide and hydrogen sulfide on heated substrates. Yocom, et al. does show a strontium sulfide thin film phosphor which has a more bluish color (CIE x=0.17, y=0.25) than an unfiltered SrS:Ce device. However, the luminance performance of the Yocom et al. device is not high enough for practical application. Experimentation has also been reported regarding SrS:Cu devices which are prepared by sputtering, for example in Ohnishi et al., proceedings of the SID 31/1, 31 (1992). The Ohnishi et al. device, however, is even dimmer than the Yocom et al. device (and no color data is available). Thus, to date producers of thin film electroluminescent devices have yet to produce a blue emitting phosphor having sufficient luminance for use in a full color ACTFEL device.

BRIEF SUMMARY OF THE INVENTION

The luminance of a blue light emitting phosphor is substantially improved according to the present invention which includes an ACTFEL device having front and rear electrode sets, a pair of insulators sandwiched between the front and rear electrode sets, and a thin film electroluminescent laminar stack which includes a phosphor layer having the formula $M^{II}S:D,H,F$ where $M^{II}$ is taken from the group calcium, strontium, barium, and magnesium, S=sulfur, D is taken from the group copper, lead, gold, silver, magnesium, antimony, bismuth and arsenic, H is taken from the group fluorine, chlorine, bromine, and iodine, and F is taken from the group gallium, indium, aluminum, germanium, silicon, lanthanum, scandium, and yttrium.

Preferably the phosphor laminate stack is annealed at between 550° and 850° centigrade prior to deposition of the top insulator layer. The $M^{II}S:D,H,F$ layer includes concentrations of dopants as follows: the primary dopant D should be between 0.05 and 5 mol %; H should be between 0.05 and 5 mol % and F should be between 0.5 and 10 mol %. Additional phosphor layers in the electroluminescent laminate stack may be of materials that produce red and green light respectively so that the laminate stack as a whole produces "white" light. The layers in the EL phosphor laminate stack may be deposited by sputtering, atomic layer epitaxy, evaporation and MOCVD. The preferred formulation for the $M^{II}S:D,H,F$ layer is SrS:Cu,I,Ga. This device produces a blue emitting phosphor device having a broad band emission spectrum capable of producing a deep blue color and having a luminance efficiency which is more than double the best available blue emitting phosphor to date.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 3 is a graph illustrating the brightness and efficiency versus voltage characteristics of the phosphor sample of FIG. 2.

DETAILED DESCRIPTION OF THE INVENTION

Figure 1:
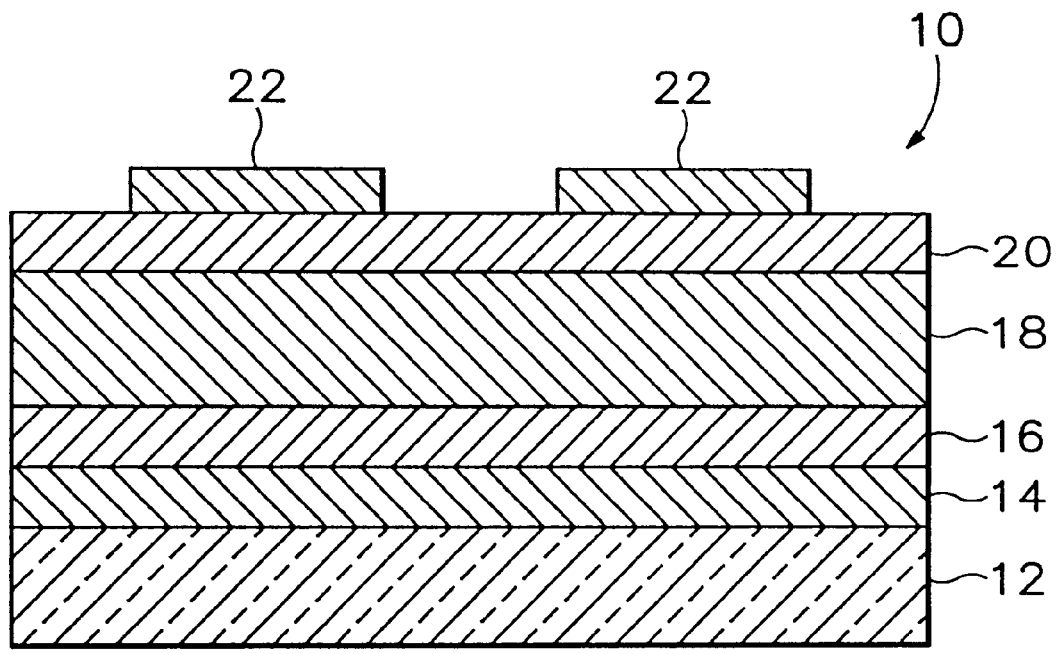
FIG. 1 is a partial side cutaway view of an ACTFEL device constructed according to the invention.

An ACTFEL device 10 as shown in FIG. 1 includes a glass substrate 12 onto which is deposited a layer of indium tin oxide 14. Next an insulator layer 16 comprising an aluminum/titanium oxide is deposited. A phosphor layer 18 comprises a thin film of SrS:Cu,I,Ga. The phosphor layer 18 is sandwiched by a second insulator 20 preferably made of barium tantalate (BTO). Aluminum electrodes 22 are placed atop the BTO layer 20. The first insulator layer 16 is preferably approximately 260 nanometers thick and is deposited by atomic layer epitaxy (ALE). The electroluminescent phosphor layer 18 may be 600 nanometers to 2 micrometers thick and it is deposited by sputtering from an SrS target prepared with the following doping concentration: copper, 0.05 to 5 mol %; iodine, 0.05 to 5 mol %; gallium, 0.5 to 10 mol %. To make a full color panel, a second phosphor layer such as ZnS:Mn or other red emitting phosphor (not shown in FIG. 1) may be deposited on the layer 18. During deposition, the substrate temperature is held to between 75° and 500° C. The phosphor films are then annealed at 550° to 850° C. in nitrogen. This is followed by the deposition of the second insulator layer 20 which is 300 nanometers of BTO. The top aluminum electrodes 22 complete the device fabrication. Red, blue, and green filters may be interposed between the bottom electrode layer 14 and the viewer (not shown) to provide a filtered full-color TFEL display.

Figure 1A:
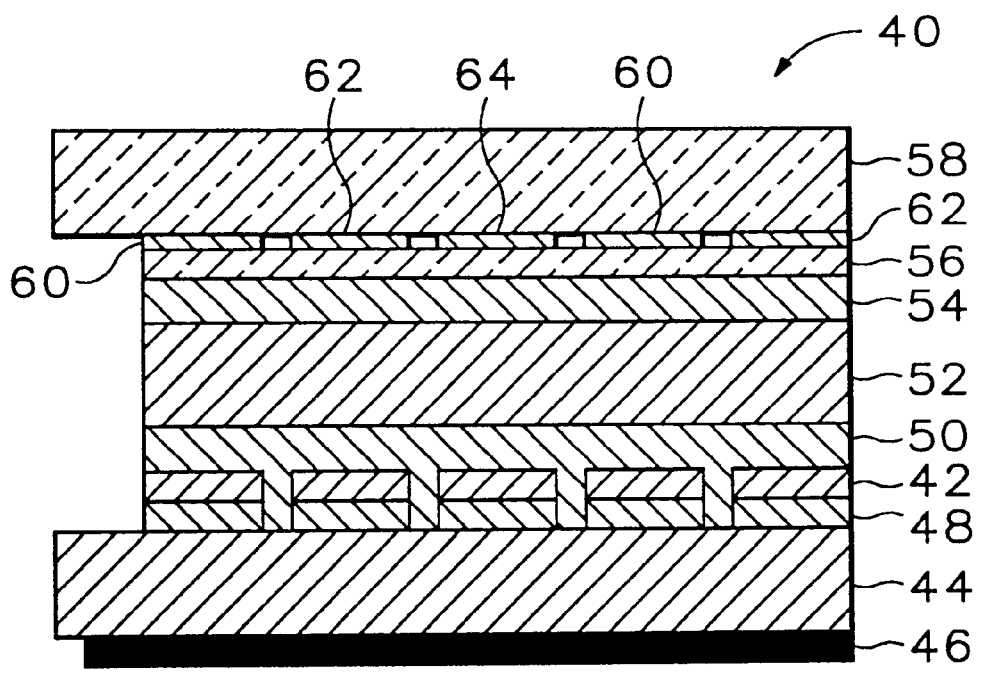
FIG. 1A is a partial side cutaway view of an alternative embodiment of an ACTFEL device made according to the invention.

FIG. 1A shows an "inverted" structure electroluminescent device 40 that is similar to FIG. 1. The device 40 is constructed with a substrate 44 that preferably has a black coating 46 on the lower side if the substrate 44 is transparent. On the substrate 44 are deposited rear electrodes 48. Between the rear electrodes 48 and the rear dielectric layer 50 is a thin film absorption layer 42. The absorption layer is either constructed of multiple graded thin film layers or is a continuous graded thin film layer made by any appropriate method. An electroluminescent layer 52 which may be a laminated structure including at least one layer having the formula $M^{II}S:D,H,F$ is sandwiched between a rear dielectric layer 50 and a front dielectric layer 54. In an alternative embodiment, either dielectric layer 50 or 54 could be removed. A transparent electrode layer 56 is formed on the front dielectric layer 54 and is enclosed by a transparent substrate 58 which includes color filter elements 60, 62 and 64 filtering red, blue and green light, respectively.

Figure 2:
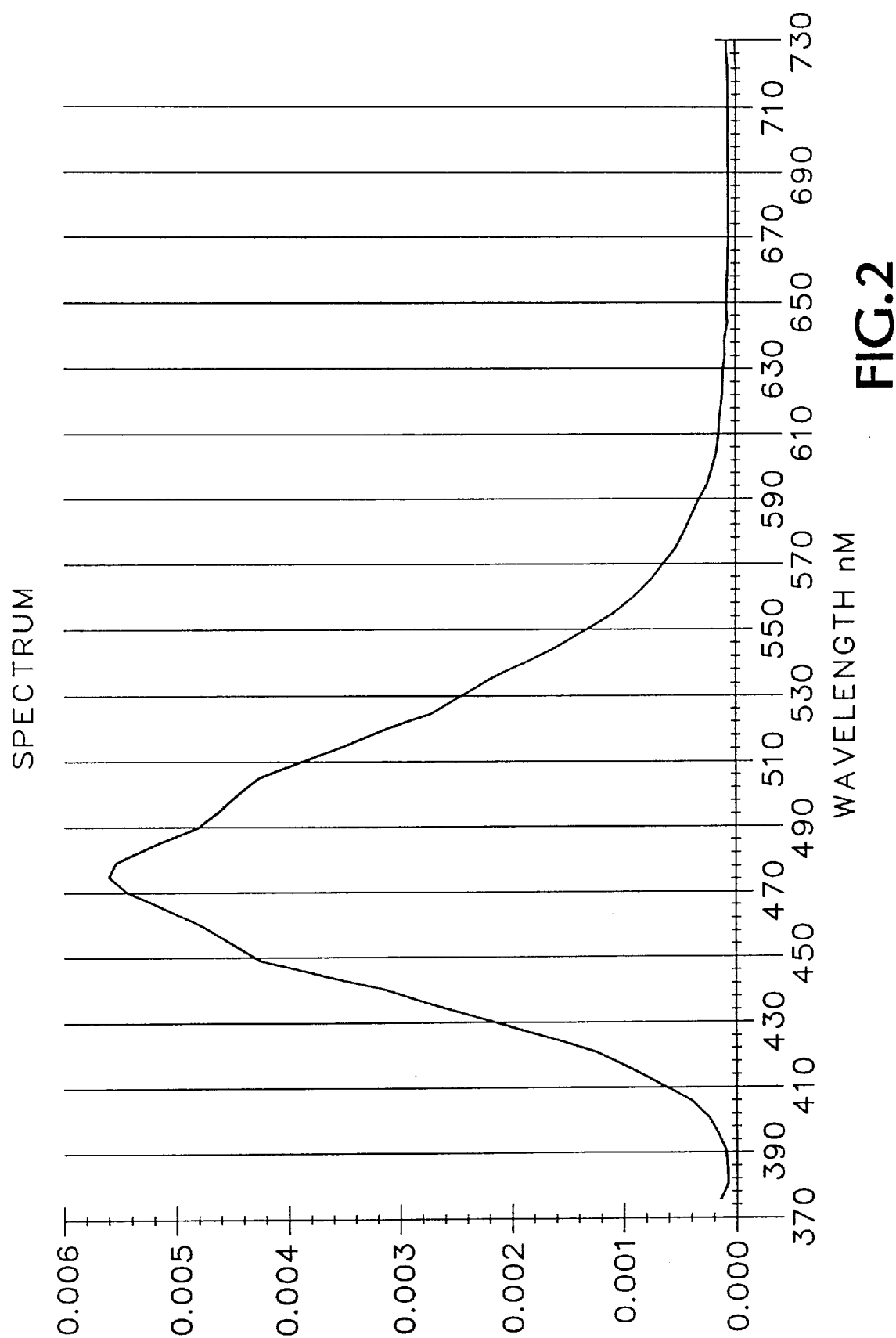
FIG. 2 is a graph illustrating the spectral characteristics of one prepared sample of the blue emitting phosphor of the invention.

The emission band of the SrS:Cu,I,Ga layer is very broad, spanning from 400 nm to 670 nm. Most samples of this phosphor exhibit either a single band or a double band with a peak position which varies between 470 and 530 nm. Devices with a single peak such as a sample whose spectral characteristics are shown in FIG. 2, have a peak at 480 nm and color coordinates of CIE x=0.156, y=0.238. This sample was prepared with an SrS sputtering target doped with 1 mol % copper, 1 mol % iodine and 5 mol % gallium. Other samples of this material have produced a single peak at 530 nanometers which has a very good green color where CIE x=0.268, y=0.547.

As shown below in Table 1 the luminance and efficiency of SrS:Cu,I,Ga phosphors is twice that of SrS:Ce through a blue filter.

already close to the practical limit of 185 volts, while those of the SrS based devices with a phosphor thickness between 0.7 to 1 micrometer are still only 114 to 150 volts. Since device luminance varies almost linearly with phosphor thickness, the luminance of SrS:Cu,I,Ga, is at least four times the most efficient thiogallate device.

The reason for the significant improvement of the SrS:Cu,I,Ga devices is primarily the use of gallium doping. The gallium appears to react with SrS to form a low temperature eutectic phase which turns into a liquid when annealed at temperatures above 650° C. The liquid phase drastically reduces the structural defects associated with thin film deposition. The annealed films exhibit equi-axial crystal grains with a size equal to half of the film thickness. This is not unlike the microstructure of a highly sintered phosphor powder. The identity of the low temperature eutectic phase is not entirely clear but it is possibly a pseudo ternary phase of Sr—Ga—S. Therefore, other ternary sulfide forming elements including aluminum, indium, silicon, germanium, lanthanum, scandium and yttrium may have similar effects. In addition, halides including fluorine, chlorine, bromine and iodine may also participate in the reaction since the melting point of strontium iodide is only 515° C.

The emission mechanism for copper ions in strontium sulfide is considered to be an intra-atomic transition likely between "s" or "p" and "d" electron levels since SrS:Cu without any codopant is a very efficient green emitting CRT phosphor with a peak wave length at 530 nanometers. The blue shift of emission color induced by iodine doping is probably a type of crystal field effect but the exact mechanism is not known. In addition, it has been determined that copper doping of calcium sulfide produces a much more saturated blue color, and therefore a true blue color (CIE y=0.10–0.15) may be achieved by copper doping of a mixed strontium sulfide/calcium sulfide host. In addition a reddish color may be obtained by copper or gold doping of barium sulfide. In a variation of the phosphor described above the halide co-dopant may be omitted to produce a green light emitting phosphor. For example strontium sulfide doped with copper and gallium produces a green peak wavelength at 530 nm and CIE coordinates x=0.268, y=0.547.

Therefore, a new group of broad band electroluminescent phosphors can be achieved by the combination of the above

| Phosphors | Vth (volt) | Luminance at Vth +40,60 Hz (cd/m2) | Luminous Efficiency (lm/W) | CIE x | CIE y | Normalized Lum. Eff. |
|---|---|---|---|---|---|---|
| SrS:Cu,I,Ga | 114 | 14.1 | 0.119 | 0.16 | 0.24 | 0.496 |
| SrS:Ce through blue filter | 150 | 9.0 | 0.050 | 0.09 | 0.24 | 0.208 |
| $Sr_{.5}Ca_{.5}Ga_2S_4$:Ce,O | 186 | 4.7 | 0.032 | 0.14 | 0.13 | 0.246 |
| $CaGa_2S_4$:Ce,O | 180 | 3.5 | 0.025 | 0.14 | 0.20 | 0.125 |
| $SrGa_2S_4$:Ce | 180 | 1.5 | 0.010 | 0.14 | 0.11 | 0.091 |

The thiogallate phosphors, also shown in the table, have a more saturated blue color. However, by normalizing the luminance efficiency with regard to human photo-optic sensitivity, the normalized efficiencies (see last column of Table 1) of the thiogallates are still less than half of those measured from SrS:Cu,I,Ga. Normalized luminous efficiency is defined here as the luminous efficiency divided by the CIE y coordinate value. In addition, the threshold field of the strontium sulfide based phosphor is normally around 1 megavolt per centimeter which is half of that measured in the thiogallate phosphors. This advantage is clearly demonstrated in the table because the threshold voltage of thiogallate devices with a 0.45 micrometer thick phosphor is mentioned phosphors as well as others. In general a metallic sulfide could include calcium, strontium, barium or magnesium with dopants that may include copper, lead, silver, gold, magnesium, antimony, bismuth, and arsenic and further including halide codopants as well as codopants taken from the group gallium, indium, aluminum, germanium, silicon, lanthanum, scandium and yttrium.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A light emitting phosphor material that primarily emits light in the blue region of the visible light spectrum for an alternating current thin-film electroluminescent device that includes said phosphor material sandwiched between a pair of dielectric layers suitable to substantially prevent DC current from flowing therebetween, where said phosphor material has the formula $M''S:D,H,F$ wherein $M''$ is strontium, S is sulphur, D is copper, H is iodine, and F is taken from the group gallium, wherein the doping concentration of copper is between 0.05 and 5 mol, the doping concentration of iodine is between 0.05 and 5 mol and the doping concentration of gallion is between 0.5 and 10 mol.

2. The light emitting phosphor of claim 1 wherein $M''S$ is a mixture of strontium sulfide and calcium sulfide and D is copper.

3. The ACTFEL device of claim 2 wherein F is gallium.

4. The light emitting phosphor material of claim 1 wherein said material is a thin film which has been annealed at between 550–850° C.

5. An alternating current thin-film electroluminescent device comprising front and rear sets of electrodes sandwiching a pair of insulators, said pair of insulators sandwiching thin film electroluminescent phosphor material therebetween suitable to substantially prevent DC current from flowing therebetween, said phosphor material primarily emitting light in the blue region of the visible light spectrum comprising a thin film layer having the formula $M''S:D, H, F$ where $M''$ is strontium, S is sulphur, D is copper, H is iodine, and F is gallium, wherein the dopant concentrations are: copper is between 0.05 and 5 mol, iodine is between 0.05 and 5 mol and gallium is between 0.5 and 10 mol.

6. The ACTFEL device of claim 5 wherein $M''$ is taken from the group strontium and calcium and H is iodine.

7. The light emitting phosphor of claim 1 wherein said phosphor material emits blue light, and whose emission spectrum has a peak wavelength between 470 and 530 nm.

8. The AC TFEL device of claim 5 wherein said phosphor material further includes a second thin film layer of ZnS:Mn.

9. The AC TFEL device of claim 8 wherein said phosphor material further includes a third thin film layer comprising SrS:Cu,Ga.

10. The AC TFEL device of claim 5 wherein said phosphor material emits light in the blue region of the visible light spectrum and further including a second thin film phosphor layer emitting light in the yellow to red region of the visible light spectrum.

11. The AC TFEL device of claim 10 wherein said second thin film phosphor is ZnS:Mn.

12. The AC TFEL device of claim 5 further including a second thin film phosphor layer comprising SrS:Cu,Ga.

* * * * *

UNITED STATES PATENT AND TRADEMARK OFFICE
CERTIFICATE OF CORRECTION

PATENT NO. : 5,939,825
DATED : August 17, 1999
INVENTOR(S) : Sey-Shing Sun et al.

It is certified that error appears in the above-identified patent and that said Letters Patent is hereby corrected as shown below:

Column 5, claim 1,
Line 15, "gallion" should be replaced with "gallium."

Signed and Sealed this

Twelfth Day of March, 2002

Attest:

JAMES E. ROGAN
*Director of the United States Patent and Trademark Office*

*Attesting Officer*